L. G. LE COMPTE.
CIRCUIT CLOSING DEVICE FOR LIQUID LEVEL GAGES.
APPLICATION FILED SEPT. 26, 1917. RENEWED SEPT. 8, 1919.
1,325,160.
Patented Dec. 16, 1919.
2 SHEETS—SHEET 1.
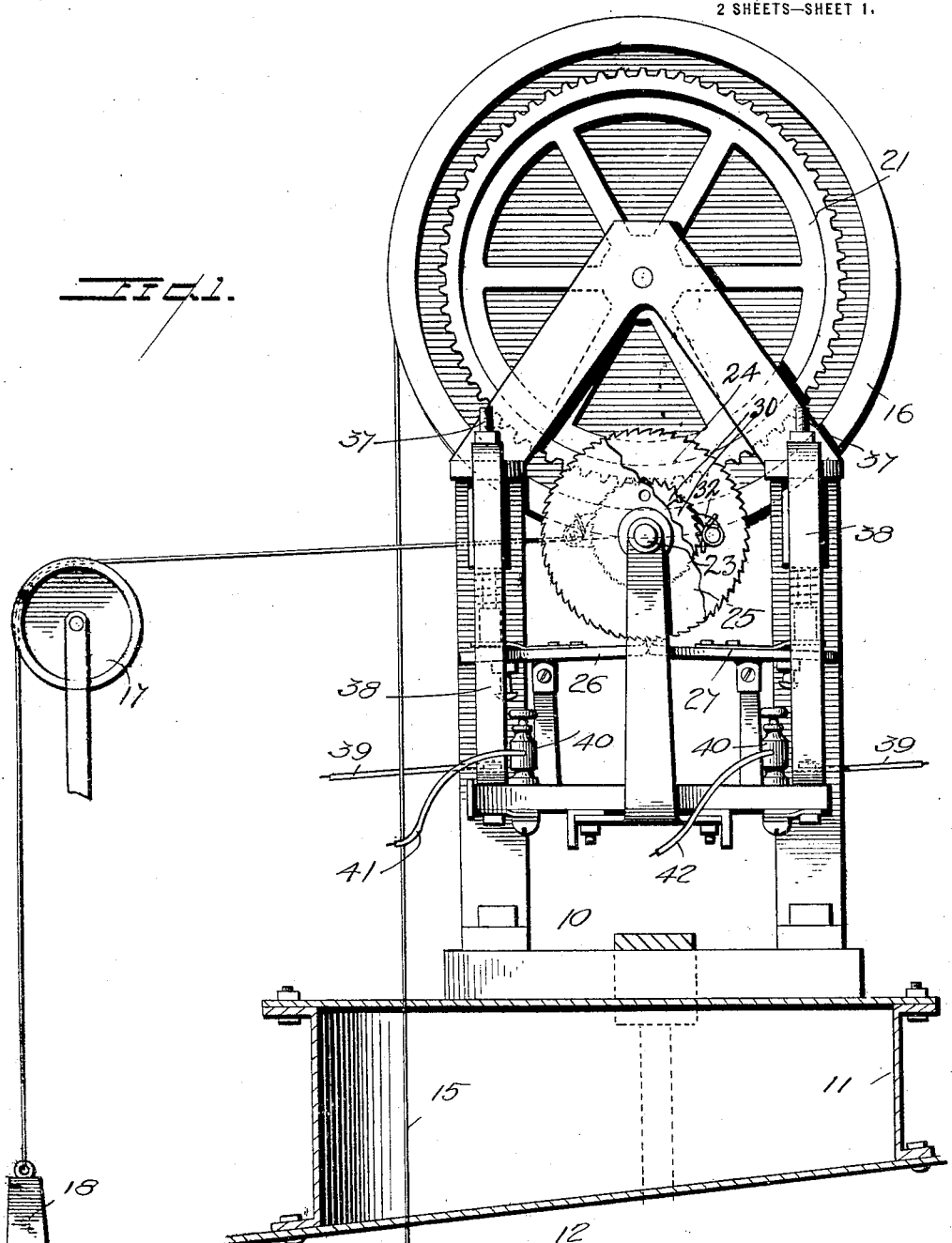
WITNESSES
INVENTOR
Leon G. Le Compte
BY
ATTORNEYS

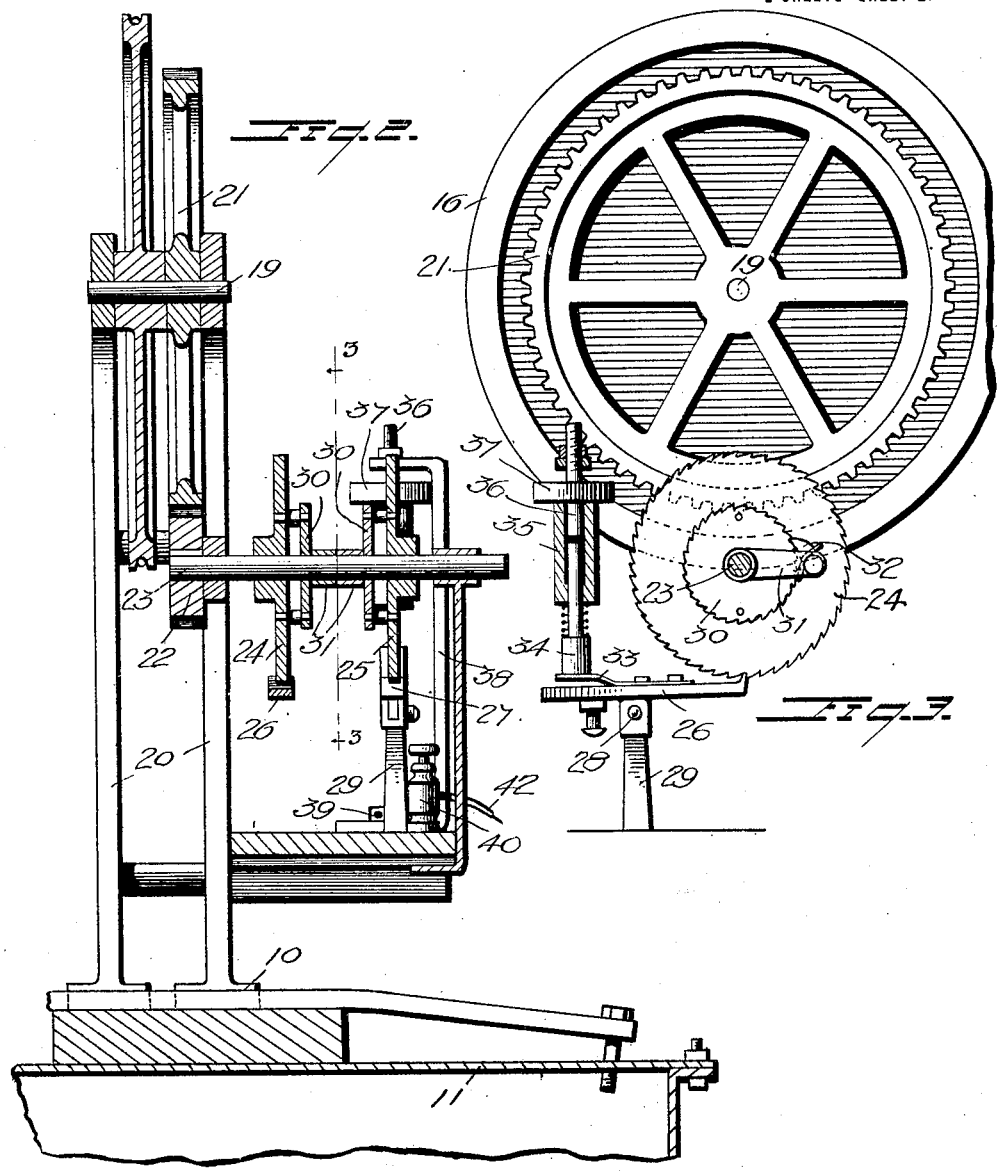

UNITED STATES PATENT OFFICE.

LEON G. LE COMPTE, OF SHANDON, CALIFORNIA, ASSIGNOR OF ONE-HALF TO ANDREW J. KNOBLOCK, OF McKITTRICK, CALIFORNIA.

CIRCUIT-CLOSING DEVICE FOR LIQUID-LEVEL GAGES.

1,325,160.     Specification of Letters Patent.     Patented Dec. 16, 1919.

Application filed September 26, 1917, Serial No. 193,365. Renewed September 8, 1919. Serial No. 322,397.

*To all whom it may concern:*

Be it known that I, LEON G. LE COMPTE, a citizen of the United States, and a resident of Shandon, in the county of San Luis Obispo and State of California, have invented a new and useful Improvement in Circuit-Closing Devices for Liquid-Level Gages, of which the following is a specification.

My present invention relates generally to liquid level gages, and more particularly to that portion thereof, directly actuated by the level of fluids, for completing a circuit upon either the rise or fall of the fluids in order to in turn actuate devices at a distant point whereby to register such rise and fall.

The objects of my present improvements are the provision of simple inexpensive means to the end above mentioned, which will be uniformly effective in their actions and will occupy minimum space installed.

More particularly, my invention resides in the features of construction, arrangement, and operation to be now described with respect to the accompanying drawings, forming a part of this specification, and wherein:

Figure 1 is a sectional front elevation illustrating my improvements.

Fig. 2 is a vertical longitudinal section taken therethrough, and

Fig. 3 is a detail vertical section taken substantially on line 3—3 of Fig. 2.

Referring now to these figures, and particularly to Fig. 1, I have shown my improvements mounted upon a supporting frame generally indicated at 10 and in turn suitably fixed, for instance, to the upper extension 11 of a liquid tank, a portion of the top of which is indicated at 12. While it is understood that my improvements may be readily utilized in connection with any bodies of liquid whose rise and fall are to be registered, where they are utilized in connection with a tank illustrated in the present instance by way of example, a tubular member 13 is utilized within the tank, in which is vertically adjustable a float 14 connected to the lower end of an operating rope or cable 15, the upper portion of which extends above the tank and extends around a wheel or pulley 16 and off to one side below the pulley, the opposite end of the rope or cable depending, for instance, around a guide pulley 17 and having a counter-weight 18 at its extremity. Thus, when the float 14 rises, the pulley 16 will be rotated in one direction, while when the liquid level drops with the float 14, the said pulley will be rotated in the opposite direction.

The pulley 16 above mentioned and as particularly seen in Fig. 2, is secured upon a shaft 19 journaled in uprights 20 and upon which is also secured an enlarged gear wheel 21, meshing at its lower portion with a smaller gear wheel 22 secured upon one end of a shaft 23 arranged in a plane below and parallel with the shaft 19.

Disposed upon the last mentioned shaft 23 are a pair of loose ratchet wheels 24 and 25, the peripheral ratchet teeth of which respectively engage the inner ends of a pair of contact levers 26 and 27, each of these levers being fulcrumed at a point intermediate its ends as seen at 28, upon the upper end of a supporting post 29.

Further referring to the ratchet wheels 24 and 25 as seen in Fig. 2, for instance, it will be noted that each ratchet wheel has a supplemental ratchet wheel 30 secured thereto at one side and likewise journaled upon the shaft 23, the teeth of ratchet wheels 24 and 25 as well as ratchet wheels 30 being inclined in relatively opposite directions. Upon the shaft 23 between the ratchet wheels 30, are secured the inner ends of a pair of arms 31, one of which is plainly seen in Fig. 3, these arms projecting in diametrically opposite directions and having upon their outer ends spring-controlled pawls 32 engaging the peripheries of the ratchet wheels 30.

Thus, when the shaft 23 is rotated in one direction, the actuating pawl of the ratchet wheel 24 will slip over the teeth of the respective ratchet wheel 30 while the pawl of the other ratchet wheel 25, engaging the respective ratchet wheel 30 thereof, will rotate the same in order to rock the respective contact levers 26, 27.

At its outer end, each of the levers 26, 27 as seen in Fig. 3 in particular, carries a spring 33 on which is seated the lower enlarged end of a vertically projecting contact stud 34, the latter extending upwardly within the lower end of a stationary cylinder 35 with its upper end normally in spaced relation to the lower end of a contact pin 36 depending into the upper end of the cylinder 35 and insulated therefrom by means of a fiber or other non-conducting bushing 37.

Each of the contact cylinders 35 is secured, by means of the upper portion of the pin 37 thereof, to the upper portion of a supporting bracket 38, to the lower end of which is secured the adjacent end of the respective battery wire 39, as seen in Fig. 1 in particular, so that current from the battery (not shown) will pass upwardly through the bracket 38 to the contact pin 37.

At the lower ends of each of the supporting posts 29 of the contact levers, is a binding post 40, and from these binding posts, wires 41 and 42 lead to the annunciating or registering apparatus where the movements of the surface of the liquid are to be registered through the use of the electrical apparatus actuated upon the completion of a circuit through either of the contact studs 34.

Thus, it is obvious that upon rotation of the ratchet wheel 24, the contact lever 26 will be rocked on its fulcrum and its contact stud 34 elevated into contact with its contact pin 37, thus completing a circuit from the battery through the wire 41 leading to the apparatus to be actuated, while when the shaft 23 is rotated in the opposite direction and ratchet wheel 25 likewise rotated, the lever 27 will be rocked on its fulcrum and a circuit completed from the battery through the wire 42 to the mechanism to be actuated.

In this way, by so arranging the parts that the ratchet wheels 24 and 25 will be rotated the distance of one tooth for every rise and fall of the level of the liquid a certain distance, such rise and fall can, through the improved circuit making device just fully described, be conveniently and accurately registered at a distant point, for the various purposes for which this information is or may be desirable.

I claim:

1. A float controlled circuit closer, including a float controlled rotatable shaft, a pair of ratchet wheels loosely mounted on the shaft, a pair of normally inactive circuit closing levers, each having one end engaging one of the said ratchet wheels, a second pair of ratchet wheels loosely mounted upon the shaft each of which is connected to one of the first mentioned wheels, one adjacent to each of the first-named ratchet wheels, and having their teeth inclined in relatively opposite directions, arms secured to the shaft and extending therefrom in diametrically opposite directions, spring controlled pawls carried by the said arms and engaging the second-named ratchet wheels, whereby to actuate one of the first mentioned ratchet wheels when the shaft is rotated in one direction, and the other of the first mentioned ratchet wheels when the shaft is rotated in the opposite direction.

2. A float controlled circuit closer, including a float controlled rotatable member, a pair of contact devices having separate circuits, and each including a contact cylinder having a contact member extending into one end thereof and insulated therefrom, a spring controlled contact plug shiftable within the opposite end of the cylinder and in normally spaced relation to the contact pin, and a circuit closing lever engaging the contact plug to shift the latter into contact with the pin, means carried by the float controlled member for actuating the lever of one of said contact devices upon rotation of the said member in one direction, and means carried by the said float controlled member for actuating the lever of the other contact device upon rotation of the member in the opposite direction.

LEON G. LE COMPTE.

Witnesses:
JOHN P. BLACK,
H. F. MACDONALD.